H. J. HEDGES.
ICE CREAM FREEZER.
APPLICATION FILED APR. 10, 1911.
1,010,046.
Patented Nov. 28, 1911.
2 SHEETS—SHEET 1.
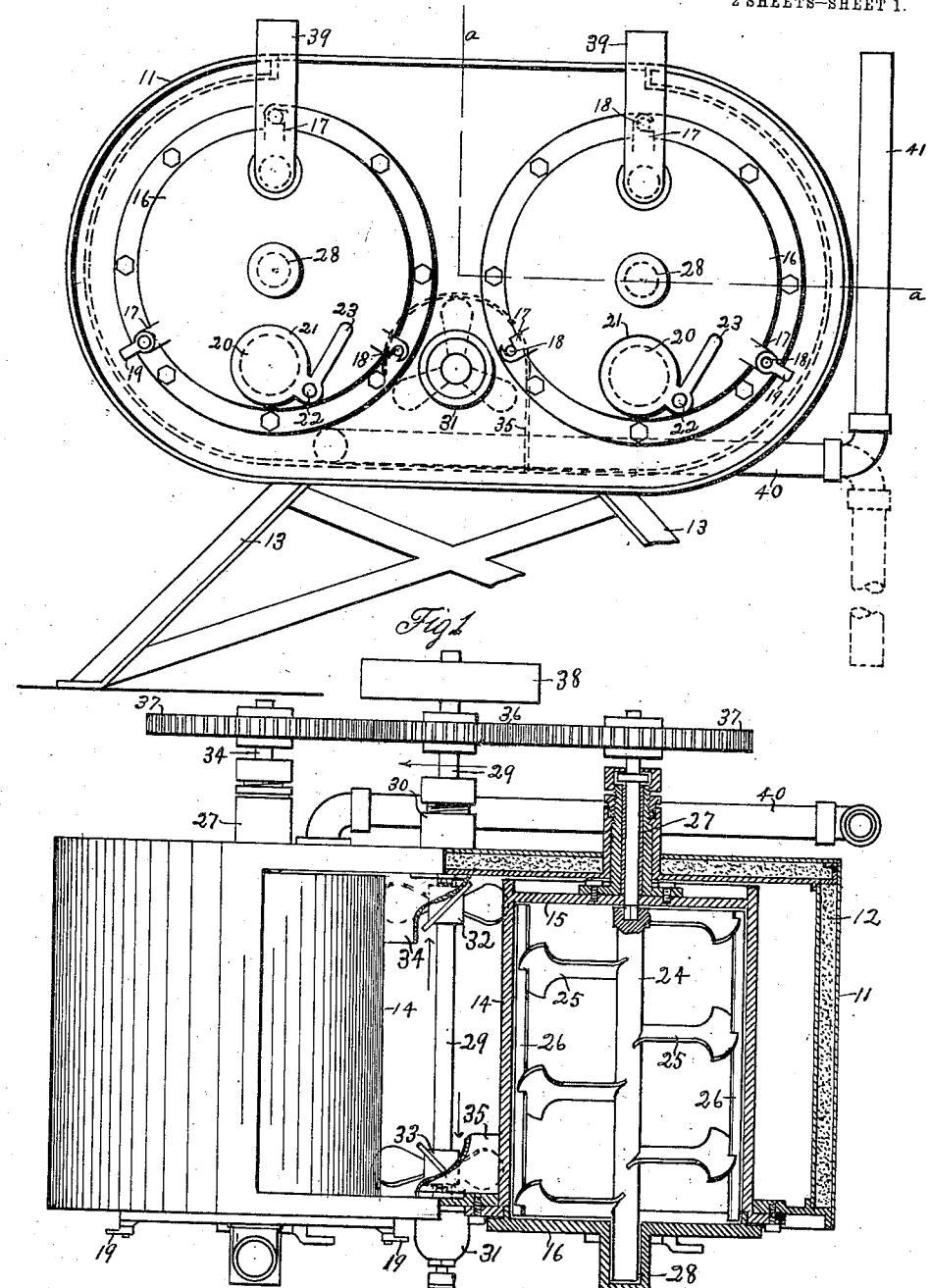
WITNESSES:
INVENTOR
Harry J. Hedges.
BY
Hardway & Cathey
ATTORNEYS.

H. J. HEDGES.
ICE CREAM FREEZER.
APPLICATION FILED APR. 10, 1911.

1,010,046.

Patented Nov. 28, 1911.

2 SHEETS—SHEET 2.

WITNESSES:
G. T. Dougherty
[signature]

INVENTOR
Harry J. Hedges.
BY
Hardway & Cather
ATTORNEYS.

UNITED STATES PATENT OFFICE.

HARRY J. HEDGES, OF HOUSTON, TEXAS.

ICE-CREAM FREEZER.

1,010,046.　　　　Specification of Letters Patent.　　Patented Nov. 28, 1911.

Application filed April 10, 1911. Serial No. 620,003.

*To all whom it may concern:*

Be it known that I, HARRY J. HEDGES, a citizen of the United States, residing at Houston, in the county of Harris and State of Texas, have invented certain new and useful Improvements in Ice-Cream Freezers, of which the following is a specification.

My invention relates to new and useful improvements in ice cream freezers.

The object of the invention is to provide a device of the character described having a suitable casing and cream receptacles mounted therein in which the cream is frozen and also comprehends a mechanism whereby the freezing brine, with which the casing is filled, is kept in constant circulation about said receptacles.

Another feature resides in the provision of a means within the cream receptacles for agitating the cream while it is being frozen in order that when the same is frozen it will be of a uniform consistency.

With the above and other objects, which will be set forth more in detail hereinafter, in view, my invention has particular relation to certain novel features of construction and operation an example of which is given in this specification and illustrated in the accompanying drawings, wherein:—

Figure 3:
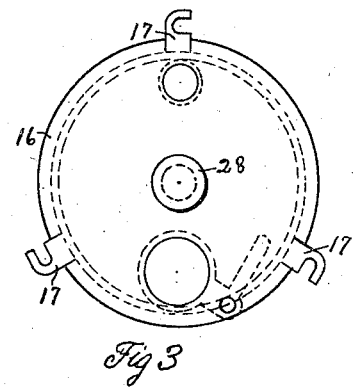
Figure 4:
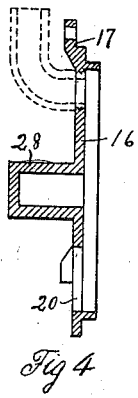
Figures 5, 6, 7, 8:
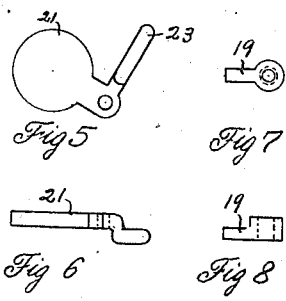
Figure 9:
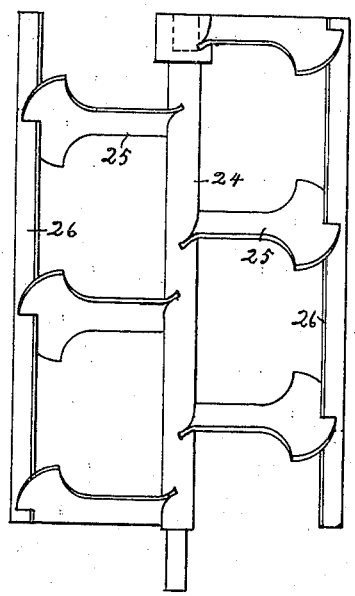
Figure 10:
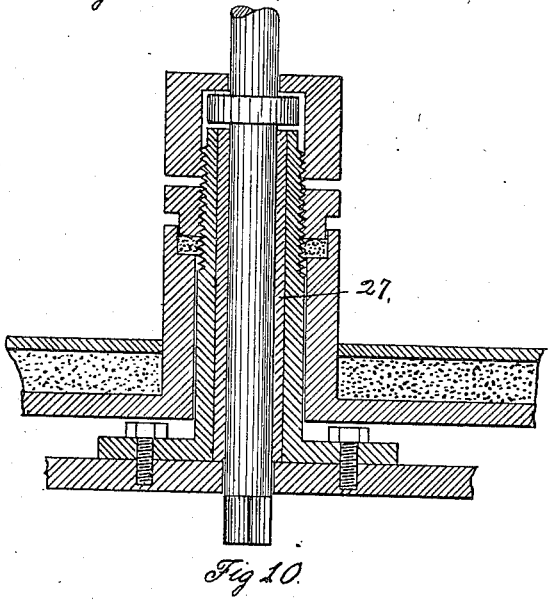

Figure 1 is a front elevation of my complete device, showing a portion of the support therefor broken away. Fig. 2 is a plan view thereof, partially in section, the line of section being taken on the line *a—a* of Fig. 1. Fig. 3 is a plan view of the removable head for the freezing cans. Fig. 4 is a sectional side elevation thereof. Fig. 5 is a plan view of the discharge cover or gate. Fig. 6 is a side elevation thereof. Fig. 7 is a plan view of the securing nut for the freezing can head. Fig. 8 is a side elevation thereof. Fig. 9 is a plan view of the cream agitator, and Fig. 10 is a sectional view of the agitator and stuffing box.

Referring now more particularly to the drawings, wherein like numerals of reference designate similar parts in each of the figures, the numeral 11 refers to the freezer casing, which in end elevation presents a contour substantially elliptical in shape, as shown in Fig. 1, and whose sides and rear end have double walls, the walls being a slight distance apart and the space between them being filled with paraffin, or some similar substance. The central portion of the top of the casing is left open, as shown in Figs. 1 and 2, so that the freezer may be easily filled with the necessary ice and salt to be used in the process of freezing the cream. This casing is mounted on a suitable support 13.

Within the casing, and secured to the end members thereof, the freezing cans 14 are mounted. These cans are, preferably, cylindrical in shape and extend from end to end of the casing and, in the preferred form of the device two freezing cans are provided, as shown in Figs. 1 and 2. These cans are made out of metal, or some good conductor of heat and are so located, with reference to the sides of the casing and to each other as to allow a free passageway for the freezing brine around each can. Each can is provided with an end 15, which is secured thereto and is, preferably, made integral therewith, and is also provided with a removable head, 16, which is designed to be secured upon the open end of the can. This head is provided with a plurality of hooks 17 which radiate from it and project beyond the edge thereof and engage over suitable studs 18, carried by the rim of the open end of the freezing can. These studs are outwardly threaded and receive securing nuts 19 which are designed to be screwed on said studs to hold the head securely thereon. The heads 16 are each provided with a discharge opening 20, near the lower portion thereof, through which the frozen cream is discharged. Each opening is provided with a suitable gate 21 which is pivoted to the head 16 at the point 22, and is provided with a handle 23 by means of which said gate may be manipulated on its pivot and the discharge opening 20, opened and closed.

Each of the freezing cans is provided with an agitator provided for the purpose of thoroughly mixing the cream as it is being frozen so that when the cream is frozen it will be of uniform consistency. This agitator comprises the central shaft 24, the radiating paddles 25 and the longitudinal blades 26. The shaft 24 extends lengthwise through the freezing can and is centrally located with respect thereto and rotates in the bearings 27 and 28, carried by the respective ends of said cans as shown in Fig. 2. The bearing 27, as shown in detail in Fig. 10, extends through the end of the freezer casing and is constructed in the manner of the ordinary stuffing box so as to prevent any leakage of the cream from the freezing can or any brine from the freezer casing, while the bearing 28 is a cylindrical boxing which is carried by the removable head 16. The paddles 25 are secured to the shaft 24 and extend therefrom in opposite directions, some of the paddles extending in the opposite direction from the others, the paddles on one side of the shaft alternating with the paddles on the other side thereof. The outer ends of the paddles are considerably wider than the inner ends thereof and the operative faces of the paddles are inclined to the plane of rotation of the paddles and tend to gradually force the contents of the can toward the discharge end thereof, but while the discharge opening 20 is closed, and the cream is prevented from escaping from the can the outer ends of the paddles 25, having a much larger operative face than the inner ends of the paddle, force the cream around the walls of the can toward the discharge end of the can much faster than the cream around shaft 24 and consequently the cream around said shaft is forced in an opposite direction and the contents of the can thus thoroughly agitated and mixed and as the paddles are inclined to their plane of rotation, the force exerted against the cream is gradual and the cream is not converted into butter as would be the case were the operative faces of the paddles not inclined to their plane of rotation. Blades 26 are secured to the outer end of the paddles 25 and extend lengthwise of the freezing cans and from end to end thereof, and are arranged to sweep around the walls of the can and prevent the cream from freezing to said walls. When the cream has been frozen to the desired consistency, by a suitable manipulation of handle 23, the gate 21 may be withdrawn from over the discharge opening 20 and the contents of the can will be forced through said discharge opening by the action of paddles 25 against said contents.

The numeral 29 refers to a rotatable shaft which is mounted in bearings 30 and 31 carried by the ends of the freezer casing and located near the bottom of said casing and between the freezing cans. Within the end walls of the freezer casing and rigidly mounted on shaft 29 are paddle wheels 32 and 33, the paddle wheel 32 is incased by a hood 34 and the paddle wheel 33 is incased by a similar hood 35, these hoods, together with the end walls of the freezer casing forming partially inclosed chambers in which the paddle wheels 32 and 33 are free to rotate and by which said paddle wheels are protected from the ice within the casing. The inner end of each hood is left open and one side of each hood is also left open so as to permit the discharge of water therefrom, the open side of each hood facing in the opposite direction from the open side of the other hood. The paddle wheels 32 and 33 are composed of a suitable hub and radiating paddles carried thereby, the operative faces of the paddles being so inclined with respect to the plane of rotation thereof as to draw the water from the casing through the open ends of the hoods and discharge the brine through the open sides of said hoods and the rotation of said paddles is of a sufficient velocity to create a current which will continue from its respective wheel along the wall of the freezer casing and around the freezing can toward which said hood opens, and thus a continuous current of water is kept flowing around each of the freezing cans. The shaft 29 carries the rigidly mounted gear wheel 36 which meshes with similar gear wheels 37 rigidly mounted on the corresponding ends of shafts 34. Rotation is imparted to shaft 29 through the drive pulley 38 which is rigidly mounted on said shaft and which receives rotation from a suitable motor (not shown), and this rotation is imparted to shafts 24 through the gear wheels 36 and 37.

The heads 16 are provided with suitable inlets 39, which communicate with the interior of the freezing cans and through which said cans may be filled with the unfrozen cream, and the freezer casing is provided with a relief pipe 40, which communicates with the interior of the freezer casing and through which the freezing brine may be drawn off from said casing. The outer end of the relief pipe 40 is provided with an elbow which is rotatable thereon and this elbow carries a pipe section 41. When it is desired to retain the brine within the casing the pipe section is turned so that it will extend upwardly, as shown in Fig. 1, but when it is desired to drain the casing this section is turned so as to extend downwardly, as shown in dotted lines in Fig. 1, and the brine thus permitted to drain off through pipes 40 and 41.

The freezing cans are first filled with the unfrozen cream, and other ice cream ingredients through inlet pipes 39 and crushed ice is then placed in the casing between said cans and a suitable amount of salt is mingled with the ice to cause the rapid melting thereof; the machine is then set in motion, the shaft 29 rotating in the direction indicated by the arrow in Fig. 2. As the ice melts the brine is drawn within hoods 34 and 35 by reason of the suction created by paddles 32 and 33, entering at the points indicated by the arrows in Fig. 2, and is discharged through the open sides of said hood and the velocity imparted to said brine by said paddle wheels 32 and 33 is sufficient to create a current of liquid entirely around the freezing cans 14. At the same time rotation is imparted to the agitators within the freezing cans by reason of which the cream is thoroughly mixed and prevented from freezing tight to the walls of the cans, and by means of which the frozen cream is discharged from the cans when the gates 21 are opened, as hereinbefore set forth.

It is obvious from the construction hereinbefore described that the unfrozen ingredients may be put in the freezing cans and the frozen cream may be discharged therefrom without stopping the operation of the freezer and applicant desires to further call attention to the fact that by reason of the free circulation of the crushed ice and brine around the cans the said cans will always be kept clean and no deposits or formations will be allowed to collect on the outer surface thereof.

What I claim is:—

1. A device of the character described including a surrounding casing and a cream receptacle within the casing and secured to the walls thereof, a rotatable agitator within the said receptacle, a current generator within the casing and an inclosing hood surrounding said generator above and on one side, means for rotating said current generator, said means also having operative connection with the agitator whereby said agitator is also rotated.

2. A device of the character described including a suitable casing and a plurality of cream receptacles within the same and secured to the walls thereof, a current generator rotatably mounted within said casing and intermediate said receptacles, and operating to force the liquid in said casing in a current around said receptacles, a rotatable agitator in each receptacle, means for rotating said current generator and operative connections between said current generator and said receptacle agitators.

3. A device of the character described including a suitable casing and an outlet therefor, a plurality of cream receptacles within the casing and secured to the walls thereof and having a passageway entirely therearound, a removable head carried by each receptacle, a rotatable agitator within each receptacle, a shaft intermediate said receptacles and rotatable in suitable bearings in the end walls of said casing, current generators rigidly mounted upon said shaft and rotatable therewith and a hood secured upon the inside of each end wall and surrounding said generators on one side and above, the inclosed side of one of said hoods facing in a direction the opposite of the inclosed side of the other hood.

4. A device of the character described including a surrounding casing and a cream receptacle within the casing, an agitator within said receptacle, a current generator in the casing, means inclosing said generator above and upon one side, means for rotating said current generator and for causing a relative rotation of said receptacle and said agitator.

5. A device of the character described including a surrounding casing and a cream receptacle within the casing, an agitator within said receptacle, a current generator within the casing, an inclosing hood surrounding said generator above and on one side and means for causing a relative rotation of said receptacle and said agitator and of said receptacle and said current generator.

6. A device of the character described including a cream receptacle and a surrounding casing therefor, an agitator within said receptacle, a current generator within said casing, a hood for said generator, means for rotating said current generator, said means causing a relative rotation of said receptacle and said agitator.

In testimony whereof I have signed my name to this specification in the presence of two subscribing witnesses.

HARRY J. HEDGES.

Witnesses:
   J. W. YEAGLEY,
   A. TOMPKINS.